No. 628,112. Patented July 4, 1899.
C. PELMULDER.
AUTOMATIC STOCK WATERING FOUNTAIN.
(Application filed Mar. 28, 1899.)
(No Model.)
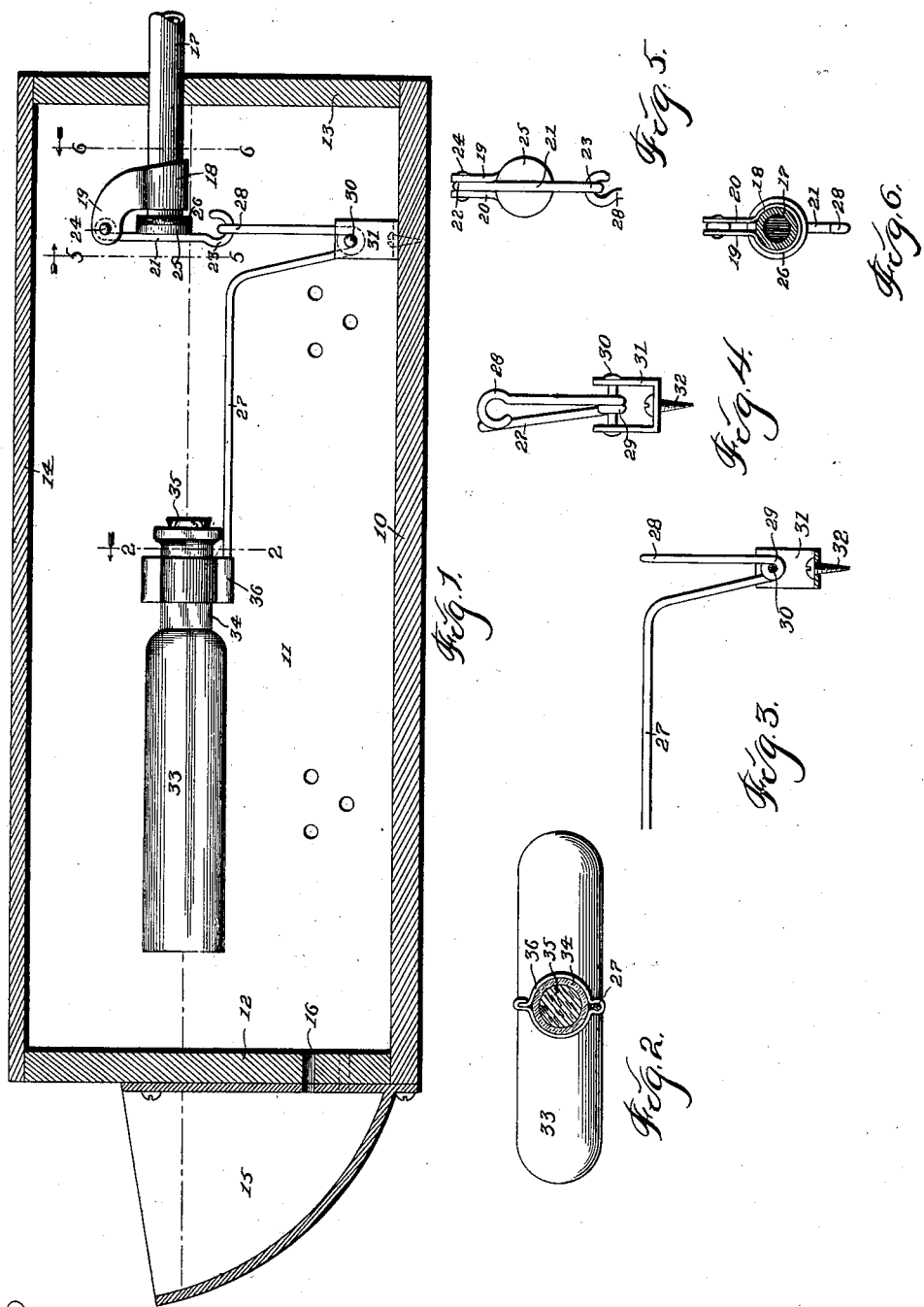
Witnesses:
John S. Rhynsburger
John H. Weets
Inventor:
Charles Pelmulder

UNITED STATES PATENT OFFICE.

CHARLES PELMULDER, OF GRANT CITY, IOWA.

AUTOMATIC STOCK-WATERING FOUNTAIN.

SPECIFICATION forming part of Letters Patent No. 628,112, dated July 4, 1899.

Application filed March 28, 1899. Serial No. 710,856. (No model.)

*To all whom it may concern:*

Be it known that I, CHARLES PELMULDER, a citizen of the United States, residing at Grant City, in the county of Sac and State of Iowa, have invented a new and useful Automatic Valve and Glass Float for Stock-Watering Fountains, of which the following is a specification.

The object of this invention is to provide improved means for governing the flow of water from a source of supply into a tank and utilizing a glass bottle of common form as a float for actuating a valve.

My invention consists in the construction, arrangement, and combination of elements hereinafter set forth, pointed out in my claims, and illustrated by the accompanying drawings, in which—

Figure 1 is a side elevation, partly in section, showing my device applied as required for practical use. Fig. 2 is a cross-section on the indicated line 2 2 of Fig. 1. Fig. 3 is a detail elevation, partly in section, of a portion of my device. Fig. 4 is a detail elevation at right angles to Fig. 3. Fig. 5 is an elevation taken from the indicated line 5 5 of Fig. 1. Fig. 6 is a cross-section on the indicated line 6 6 of Fig. 1.

In the construction and operation of the device as shown the numeral 10 designates the bottom, 11 one side, 12 13 the ends, and 14 the top, of a tank constructed to contain water, as hereinafter set forth. A plurality of drinking-cups 15, one only of which is shown, are mounted on the end 12 and sides of the tank, and ports 16 for the passage of water into said cups are provided.

A water-supply pipe 17 is mounted in the end 13 of the tank and leads from a source of supply (not shown) to the interior of said tank. A clamp 18, made of a single piece of sheet metal and terminating in apertured ears 19 20, is mounted on and around the inner end of the supply-pipe 17. A hanger 21 is formed of a single piece of wire, with an eye 22 on one end and a hook 23 opposite the eye. The eye portion of the hanger 21 is mounted between the ears 19 20 of the clamp 18 and pivoted upon a pin 24, traversing said ears and riveted or otherwise fixed in such a manner as to draw the ears toward each other and retain the clamp on the supply-pipe. A valve-plate 25 is mounted on and soldered or otherwise securely attached to the central portion of the hanger 21 in alinement with the supply-pipe 17, and said plate is of greater diameter than the supply-pipe and arranged to cover the end thereof at times. A gasket 26 is mounted on the valve-plate 25 and interposed between said plate and the inner end of the supply-pipe. A bell-crank lever 27 is constructed of a single piece of wire, with a hook 28 on one end interengaging the hook 23 on the hanger 21 and a loop near the hook 28 and designated by the numeral 29, Fig. 4. The loop 29 of the bell-crank is pivotally mounted on a pin 30, horizontally seated in the extremities of an angle-plate 31, mounted on the bottom 10 of the tank and fixed thereto by a screw 32. The portion of the bell-crank between the hook 28 and loop 29 is approximately vertical, and said bell-crank extends upwardly and rearwardly from the loop and is bent into a horizontal position at the rear and in the horizontal plane of the hook and extended rearwardly a considerable distance therefrom. The float 33 consists of a glass bottle having a neck 34 and a cork stopper 35 in said neck, thereby rendering the float imperforate, impervious to the action of the water, and sufficiently buoyant for the purpose. The float 33 is positioned horizontally in the tank and sustained by the water therein and is connected to the rear end of the bell-crank by a clamp 36, made of a single piece of sheet metal and embracing both the neck of the float and the extremity of the bell-crank, as shown in Fig. 2, in such a manner that when the bottle is broken it can be readily removed from the lever 27 and a new one attached to the lever by means of the clamp 36.

In the rise and fall of the float under the influence of the water in the tank the bell-crank is oscillated and the valve-plate 25 approximated to or separated from the inner end of the supply-pipe, thereby cutting off or turning on the supply of water to the tank.

I claim as my invention—

1. In an automatic stock-watering fountain, the lever 27 made of a single piece of wire provided with a hook 28 at one end, for detachably connecting it with a valve and a loop 29 for connecting it with a pivot, or pin and a clamp at one end for connecting it with a bottle, in the manner set forth for the purposes stated.

2. A float constructed of hollow glass and provided with a neck and a stopper in said neck, a clamp mounted on the neck of the float, a bell-crank lever rigidly attached to said clamp, a support on which said bell-crank is fulcrumed, a supply-pipe, a clamp on the terminal of said supply-pipe, a hanger pivoted on the latter said clamp and depending across the terminal of the supply-pipe, a valve-plate carried by said hanger in front of said terminal, a gasket on the valve-plate arranged to close the terminal at times, and pivotal connections between the bell-crank lever and hanger.

3. The combination of a bell-crank, a float, a clamp connecting the bell-crank and float, a supply-pipe, a valve-hanger, a clamp connecting the supply-pipe and valve-hanger, and pivotal connection between said bell-crank and valve-hanger.

CHARLES PELMULDER.

Witnesses:
JOHN S. RHYNSBURGER,
JOHN H. WIERTS.